US 6,545,821 B2

(12) United States Patent
Katsuma

(10) Patent No.: US 6,545,821 B2
(45) Date of Patent: Apr. 8, 2003

(54) DIFFRACTION TYPE LENS AND OPTICAL PICKUP APPARATUS USING THE SAME

(75) Inventor: Toshiaki Katsuma, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/805,226

(22) Filed: Mar. 14, 2001

(65) Prior Publication Data

US 2003/0043475 A1 Mar. 6, 2003

(30) Foreign Application Priority Data

Mar. 24, 2000 (JP) ......................... 2000-084488

(51) Int. Cl.⁷ .................. G02B 3/10; G02B 27/44; G11B 7/135
(52) U.S. Cl. .................. 359/721; 359/565; 369/112.03; 369/112.07
(58) Field of Search ................ 359/719, 721, 359/718, 571, 565; 369/112.03, 112.07

(56) References Cited

U.S. PATENT DOCUMENTS 6,330,118 B1 * 12/2001 Daschner et al. ........... 359/721

OTHER PUBLICATIONS

Japanese Patent Office, Japanese Unexamined Patent Publication No. 61–287042, Date of Publication: Dec. 17, 1986, Application No.: 60–127619, Application Filed: Jun. 12, 1985, pp. 233–236 (English Language Abstract).
Japanese Patent Office, Japanese Unexamined Patent Publication No. 7–191219, Date of Publication: Jul. 28, 1995, Application No.: 5–333522, Application Filed: Dec. 27, 1993, pp. 1–4 (English Language Abstract).
Japanese Patent Office, Japanese Unexamined Patent Publication No. 8–62493, Date of Publication: Mar. 8, 1996, Application No.: 7–167211, Application Filed: Jul. 3, 1995, pp. 1–35 (English Language Abstract).

* cited by examiner

Primary Examiner—Scott J. Sugarman
(74) Attorney, Agent, or Firm—Snider & Associates; Ronald R. Snider

(57) ABSTRACT

One surface of the substrate constituting a diffraction type lens is formed with a zone plate exhibiting a smaller converging action with respect to a first wavelength $\lambda_1$ of light and a greater converging action with respect to a second wavelength $\lambda_2$ of light, whereas the other surface is formed with a zone plate exhibiting a smaller converging action with respect to the second wavelength $\lambda_2$ of light and a greater converging action with respect to the first wavelength $\lambda_1$ of light. The substrate is transparent to the first and second wavelengths $\lambda_1$ and $\lambda_2$ of light. Each of the zone plates comprises concentric gratings having a stepped cross section.

6 Claims, 6 Drawing Sheets

DIFFRACTION TYPE LENS AND OPTICAL PICKUP APPARATUS USING THE SAME

RELATED APPLICATIONS

This application claims the priority of Japanese Patent Application No. 2000-084488 filed on Mar. 24, 2000, which is incorporated herein by reference.

BACKGROUND OF THE INVENTION

1. Field of the Invention

The present invention relates to a diffraction type lens in an optical pickup apparatus commonly usable for at least two kinds of optical recording media, in which, when respective irradiation light beams for the optical recording media have wavelengths different from each other according to the kinds of optical recording media, each light beam can efficiently be converged onto its corresponding optical recording medium; and an optical pickup apparatus using the same.

2. Description of the Prior Art

Various kinds of optical recording media have recently been developed, and optical pickup apparatus which can carry out recording and reproducing while commonly using a plurality of kinds of optical recording media have been known. For example, apparatus carrying out recording and reproducing of DVD (digital versatile disc) and CD-R (recordable optical disc) by use of an optical pickup have been known.

As for such two kinds of optical recording media, while visible light at about 635 nm is used for DVD in order to improve the recording density, infrared light at about 780 nm is necessary for CD-R since it is insensitive to light in the visible region. Therefore, optical pickup apparatus which can commonly be used for both of them are based on a so-called dual wavelength beam system.

If the disc thickness value varies between the above-mentioned two kinds of optical recording media, however, then such an optical pickup apparatus is required to exert different converging actions on the respective wavelengths of light for reproducing or recording.

Though a system in which two objective lenses having respective converging actions different from each other are exchangeable according to optical recording media to be reproduced or recorded has been known to respond to such a requirement, it complicates the structure of optical pickup apparatus, thereby contradicting a demand for compactness and lower cost.

On the other hand, though optical pickup apparatus using a parallel-plane diffraction optical device or the like as an objective lens thereof have been known, none of them satisfies the demand for using two wavelengths of light for the reproducing or recording of their corresponding optical recording media having disc thickness values different from each other japanese Unexamined Patent Publication Nos. 61-287042, 8-62493, and 7-191219, and the like).

SUMMARY OF THE INVENTION

In view of the circumstances mentioned above, it is an object of the present invention to provide a compact, inexpensive diffraction type lens which can favorably converge two wavelengths of light onto their corresponding optical recording media having disc thickness values different from each other, without complicating the structure of optical pickup apparatus.

The present invention provides a diffraction type lens, disposed in a luminous flux, having a wavelength selectivity;

wherein a substrate constituting the lens has one surface formed with a zone plate exhibiting a smaller converging action with respect to a first wavelength $\lambda_1$ of light and a greater converging action with respect to a second wavelength $\lambda_2$ of light, and the other surface formed with a zone plate exhibiting a smaller converging action with respect to the second wavelength $\lambda_2$ of light and a greater converging action with respect to the first wavelength $\lambda_1$ of light, the substrate being transparent to the first and second wavelengths $\lambda_1$ and $\lambda_2$ of light; and wherein each of the zone plates comprises concentric gratings having a stepped cross section.

Preferably, the diffraction type lens has a parallel-plane form.

Each of the stepped concentric gratings has three steps, for example.

Preferably, one surface formed with the zone plate has a stepped portion with a height $h_1$ per step satisfying the following conditional expressions (1) and (2), and the other surface formed with the zone plate has a stepped portion with a height $h_2$ per step satisfying the following conditional expressions (3) and (4):

$$h_1 = L_1 \lambda_1/(n_1-1) \tag{1}$$

$$h_1 = M_1 \lambda_2/(n_2-1) + K_1 \lambda_2/2(n_2-1) \tag{2}$$

$$h_2 = L_2 \lambda_2/(n_2-1) \tag{3}$$

$$h_2 = M_2 \lambda_1/(n_1-1) + K_2 \lambda_1/2(n_1-1) \tag{4}$$

where $\lambda_1$ and $\lambda_2$ are two wavelengths of incident light;

$n_1$ is the refractive index of grating portion with respect to the first wavelength $\lambda_1$ of light;

$n_2$ is the refractive index of grating portion with respect to the second wavelength $\lambda_2$ of light;

$L_1$ and $L_2$ are positive integers;

$M_1$ is the maximum value among 0 and positive integers satisfying the conditional expression of $h_1 > M_1 \lambda_2/(n_2-1)$;

$M_2$ is the maximum value among 0 and positive integers satisfying the conditional expression of $h_2 > M_2 \lambda_1/(n_1-1)$; and $K_1$ and $K_2$ are $0.27 \leq K_1$, $K_2 \leq 0.73$, or $1.27 \leq K_1$, $K_2 \leq 1.73$.

Also, the present invention provides an optical pickup apparatus comprising the above-mentioned diffraction type lens, wherein the luminous flux incident on the diffraction type lens is a substantially parallel luminous flux.

Preferably, in the optical pickup apparatus, the luminous flux is converged at a position where two kinds of optical recording media having respective thickness values different from each other are disposed, one optical recording medium being recorded or reproduced with the first wavelength $\lambda_1$ of light, the other optical recording medium being recorded or reproduced with the second wavelength $\lambda_2$ of light.

DESCRIPTION OF THE PREFERRED EMBODIMENTS

In the following, embodiments of the present invention will be explained with reference to the drawings.

Figure 10:
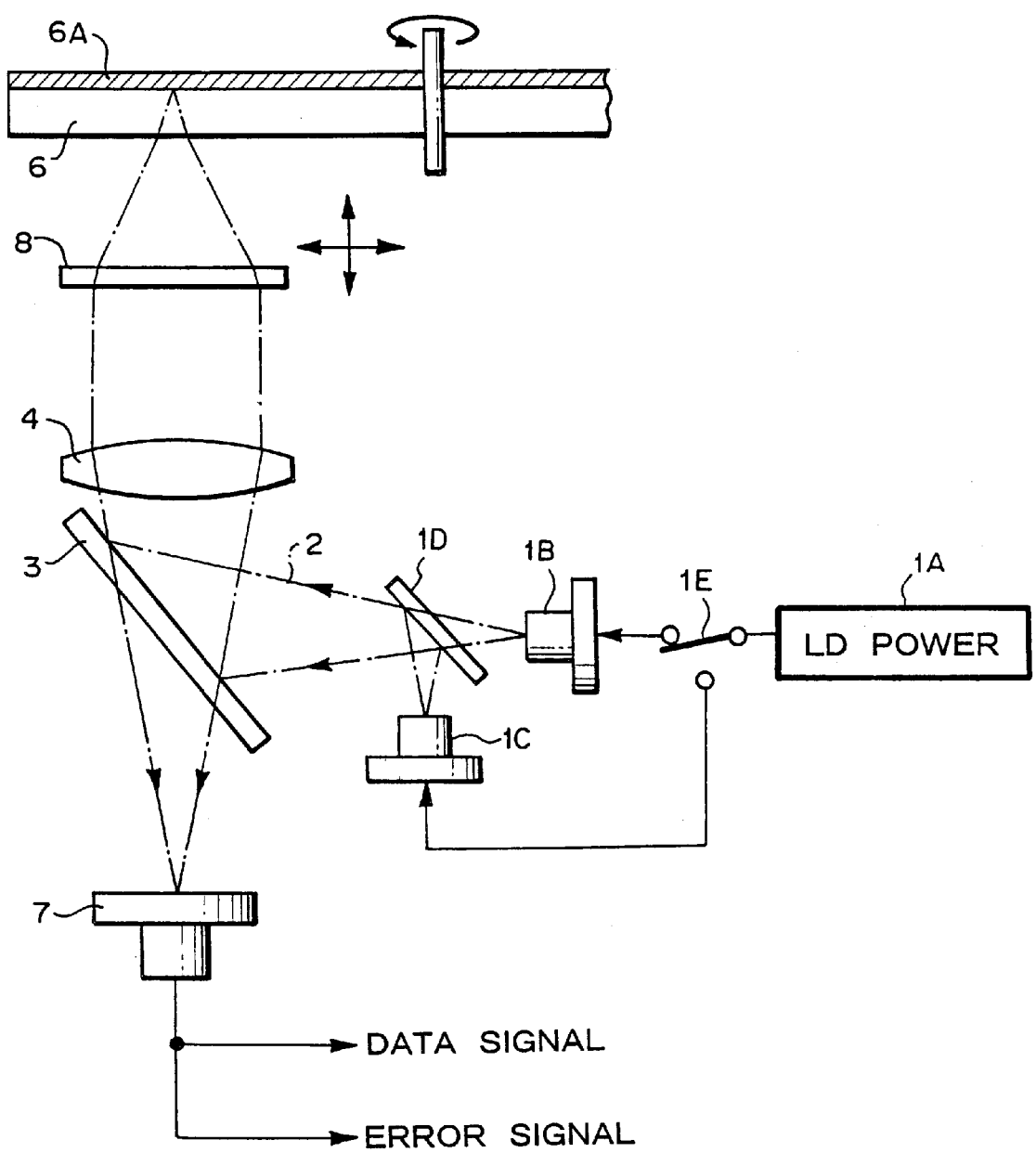
FIG. 10 is a schematic view showing the optical pickup apparatus in accordance with an embodiment of the present invention.

First, an optical pickup apparatus using the diffraction type lens in accordance with an embodiment of the present invention will be explained with reference to FIG. 10.

In this optical pickup apparatus, a semiconductor laser 1B, 1C outputs a laser beam 2 when power is supplied thereto from an LD power source 1A, a collimator lens 4 turns the laser beam 2 into parallel light, and a diffraction type lens 8 functioning as an objective lens converts the parallel light into convergent light, with which a recording region 6A of an optical disc 6 is irradiated. The semiconductor laser 1B is a light source for outputting a laser beam in a near-infrared region having a wavelength of 780 nm for CD-R (recordable optical disc), whereas the semiconductor laser 1C is a light source for outputting a laser beam, for example, in a visible region having a wavelength of 635 nm for DVD (digital versatile disc). The laser beam 2 outputted from one of the semiconductor lasers 1B, 1C irradiates the half mirror 3 by way of a half mirror 1D. A changeover switch 1E is disposed between the LD power source 1A and the semiconductor lasers 1B, 1C. As the changeover switch 1E is operated, power is supplied to one of the semiconductor lasers 1B, 1C.

In the recording region 6A, pits carrying signal information are arranged in a track. The reflected light of laser beam 2 used for reproducing the recording information from region 6A is made incident on the half mirror 3 by way of the diffraction type lens 8 and the collimator lens 4 while carrying the signal information, and is transmitted through the half mirror 3, so as to be made incident on a four-part photodiode 7. The respective quantities of light received at the four-part photodiode 7 are arithmetically operated, whereby data signals and respective error signals for focusing and tracking are obtained.

Since the half mirror 3 is inserted in the optical path of the return light from the optical disc 6 in a state tilted by 45°, it acts like a cylindrical lens, so that the light beam transmitted through the half mirror 3 has an astigmatism, whereby the amount of focusing error is determined according to the form of the beam spot of return light on the four-part photodiode 7. Here, the collimator lens 4 can be omitted depending on the circumstances. Also, a diffraction grating may be inserted between the semiconductor lasers 1B, 1C and the half mirror 3, such that tracking errors can be detected by use of three beams.

This optical pickup apparatus is configured such that signals can be recorded and reproduced for any optical disc 6 of CD-R and DVD.

Here, each of the CD-R and DVD has a protective sheet made of PC (polycarbonate; refractive index $n_D$=1.514).

Meanwhile, the geometric thickness of CD-R is standardized at 1.2 mm, whereas that of DVD is substantially standardized at 0.6 mm. For securely carrying out focusing on each optical disc 6, it is necessary to provide a configuration yielding focusing actions different from each other for the respective wavelengths of light for recording/reproducing the different kinds of discs.

Figure 1:
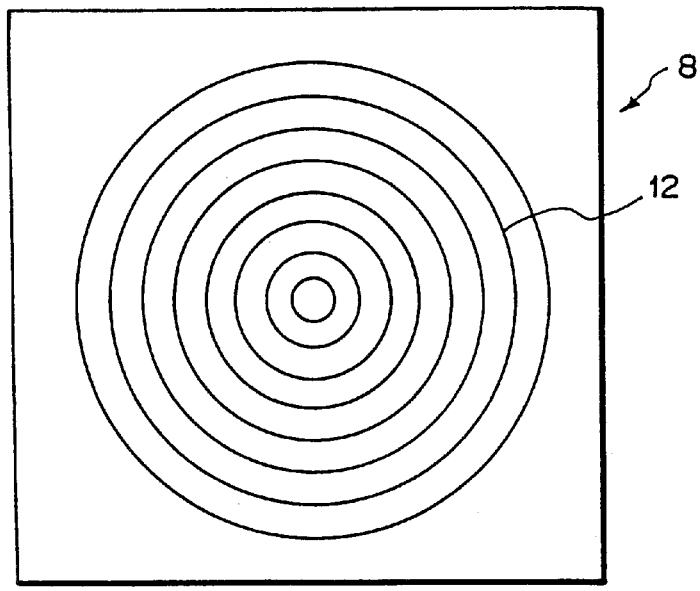
FIG. 1 is a plan view showing the diffraction type lens in accordance with an embodiment of the present invention.
Figure 2A:
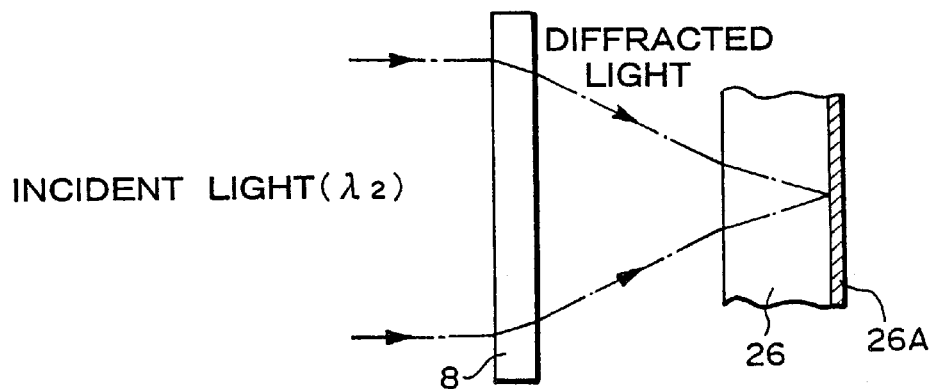
FIGS. 2A and 2B are schematic views for explaining operations of the diffraction type lens shown in FIG. 1.

Therefore, as shown in FIG. 1, the front and back faces of the diffraction type lens 8 in this optical pickup apparatus are provided with respective zone plates 12 having wavelength selectivity characteristics and converging actions different from each other, such that both CD-R and DVD can be recorded and reproduced. When a CD-R 26 is disposed at a predetermined position (on a turntable) as shown in FIG. 2A for recording or reproducing, the laser beam 2 having a wavelength of 780 nm ($\lambda_2$) from the semiconductor laser 1B is made incident on the diffraction type lens 8 while in a substantially parallel light state. In this case, the incident laser beam 2 is converged onto a recording surface 26A of the CD-R 26 by the zone plate 12 formed on the surface (hereinafter referred to as second surface) of diffraction type lens 8 on the light source side.

The zone plate 12 formed on the second surface has no converging action (i.e., yields 100% of zero-order diffracted light) for the laser beam 2 having a wavelength of 635 nm ($\lambda_1$), whereby this laser beam 2 passes through the second surface substantially as it is.

Figure 2B:
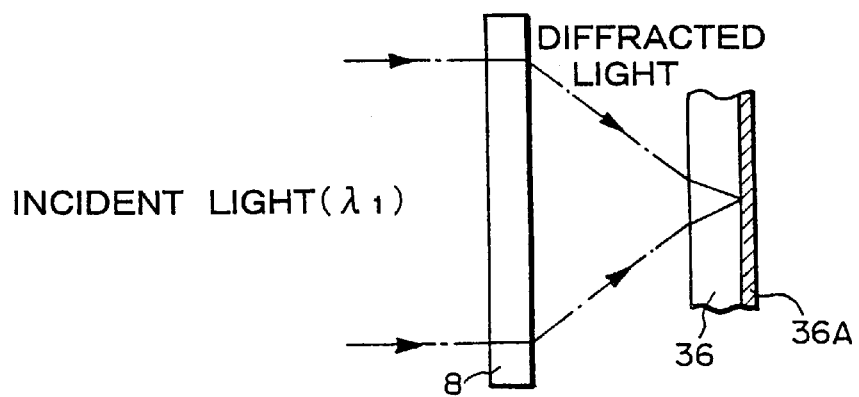

When a DVD 36 is disposed at a predetermined position (on the turntable) as shown in FIG. 2B for recording or reproducing, the laser beam 2 having a wavelength of 635 nm ($\lambda_1$) from the semiconductor laser 1C is made incident on the diffraction type lens 8 while in a substantially parallel light state. In this case, the incident laser beam 2 is converged onto a recording surface 36A of the DVD 36 by the zone plate 12 formed on the surface (hereinafter referred to as first surface) of diffraction type lens 8 on the disc side.

The zone plate 12 formed on the first surface has no converging action (i.e., yields 100% of zero-order diffracted light) for the laser beam 2 having a wavelength of 780 nm ($\lambda_2$), whereby this laser beam 2 passes through the first surface substantially as it is.

The front and back surfaces of lens 8 have zone plates which overlap each other as shown in FIGS. 3 through 7. This overlap is possible because light of one wave length does not undergo converging action at a surface which diffracts the other wave length as described with respect to FIG. 1.

Figure 3:
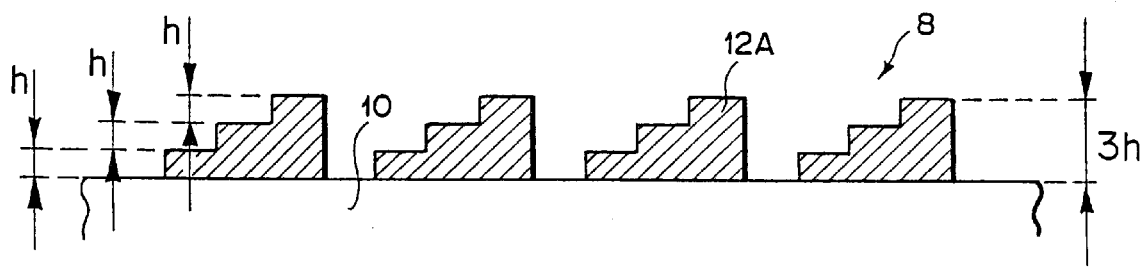
FIG. 3 is a partial sectional view showing the form of the diffraction type lens shown in FIG. 1.
Figure 4:
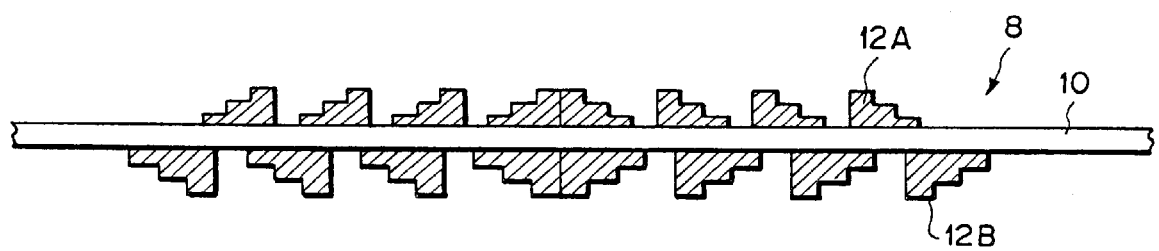
FIG. 4 is a sectional view showing the form of the diffraction type lens in accordance with an embodiment of the present invention.
Figure 5:
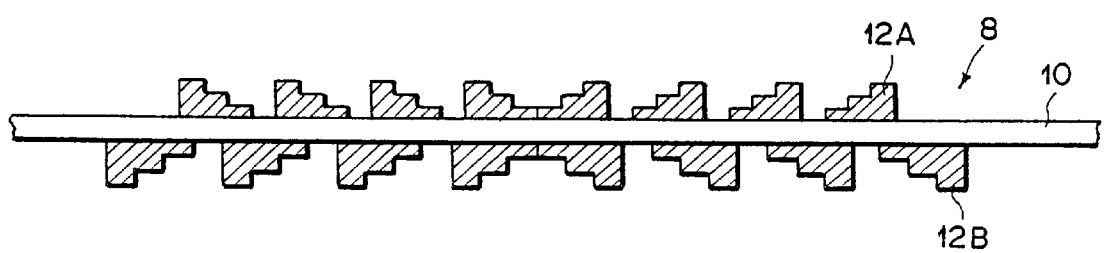
FIG. 5 is a sectional view showing the form of the diffraction type lens in accordance with an embodiment different from that of the diffraction type lens shown in FIG. 4.
Figure 6:
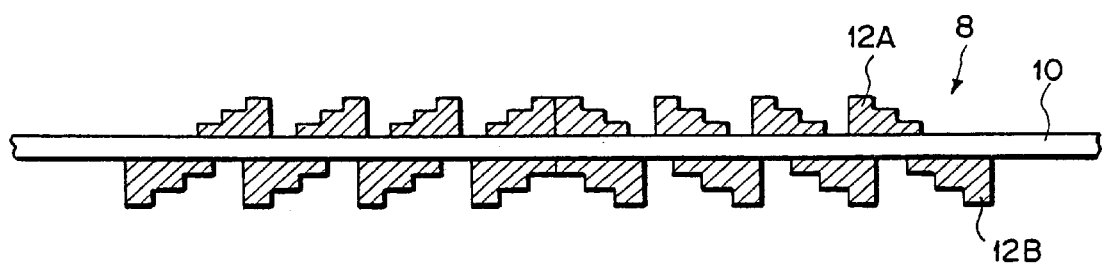
FIG. 6 is a sectional view showing the form of the diffraction type lens in accordance with an embodiment different from those of the diffraction type lenses shown in FIGS. 4 and 5.
Figure 7:
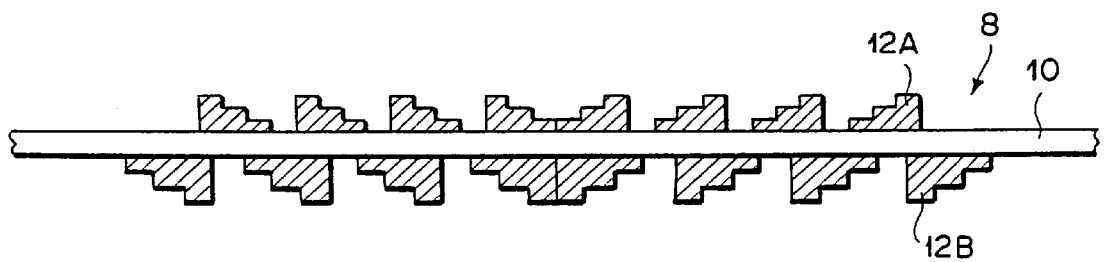
FIG. 7 is a sectional view showing the form of the diffraction type lens in accordance with an embodiment different from those of the diffraction type lenses shown in FIGS. 4, 5, and 6.

FIG. 3 shows a cross-sectional structure of the first surface of diffraction type lens 8, showing the state where a zone plate 12A having a cross section stepped on one side (having a step height h) is formed on a glass substrate 10. The height per step is h, whereas the number of steps is 3 (in each of four stages), whereby each stage as a whole has a height of 3 h.

The second surface is formed with a zone plate 12B having substantially the similar form as that mentioned above (while having different height and pitch as will be explained later).

Specific grating pitches of the zone plates 12A, 12B are determined in view of respective NA values of lenses required for DVD and CD-R.

Each stage has a respective step height $h_1$, $h_2$ set to such a value that the ratio of 1st-order diffracted light with respect to one wavelength of light becomes greater whereas the ratio of zero-order diffracted light with respect to the other wavelength of light becomes 100%.

Namely, the first zone plate formed on one surface has a stepped portion with a height $h_1$ per step satisfying the following conditional expressions (1) and (2), and the second zone plate formed on the other surface has a stepped portion with a height $h_2$ per step satisfying the following conditional expressions (3) and (4):

$$h_1 = L_1\lambda_1/(n_1-1) \tag{1}$$

$$h_1 = M_1\lambda_2/(n_2-1) + K_1\lambda_2/2(n_2-1) \tag{2}$$

$$h_2 = L_2\lambda_2/(n_2-1) \tag{3}$$

$$h_2 = M_2\lambda_1/(n_1-1) + K_2\lambda_1/2(n_1-1) \tag{4}$$

where $\lambda_1$ and $\lambda_2$ are two wavelengths of incident light;

$n_1$ is the refractive index of grating portion with respect to the first wavelength $\lambda_1$ of light;

$n_2$ is the refractive index of grating portion with respect to the second wavelength $\lambda_2$ of light;

$L_1$ and $L_2$ are positive integers;

$M_1$ is the maximum value among 0 and positive integers satisfying the conditional expression of $h_1 > M_1\lambda_2/(n_2-1)$;

$M_2$ is the maximum value among 0 and positive integers satisfying the conditional expression of $h_2 > M_2\lambda_1/(n_1-1)$; and $K_1$ and $K_2$ are $0.27 \leq K_1$, $K_2 \leq 0.73$, or $1.27 \leq K_1$, $K_2 \leq 1.73$.

In the above-mentioned conditional expressions (2) and (4), the diffraction efficiency for zero-order diffracted light becomes smaller as the value of $K_1$ and $K_2$ (collectively referred to as K) is closer to 0.5, 1.0, and 1.5, so that the diffraction efficiency for zero-order diffracted light becomes zero when K=0.5, 1.0, and 1.5, −1st-order diffracted light is maximized when K=0.5, and +1st-order diffracted light is maximized when K=1.5.

If each zone plate 12A, 12B thus has such a cross-sectional form that a stepped portion is formed on one side instead of a simple rectangular form, one of ±1st-order diffracted light components can be outputted alone if the value of K is set appropriately, whereby the diffracted light can be prevented from causing unnecessary noise if the arrangement and size of each member are designed suitably.

Figure 8:
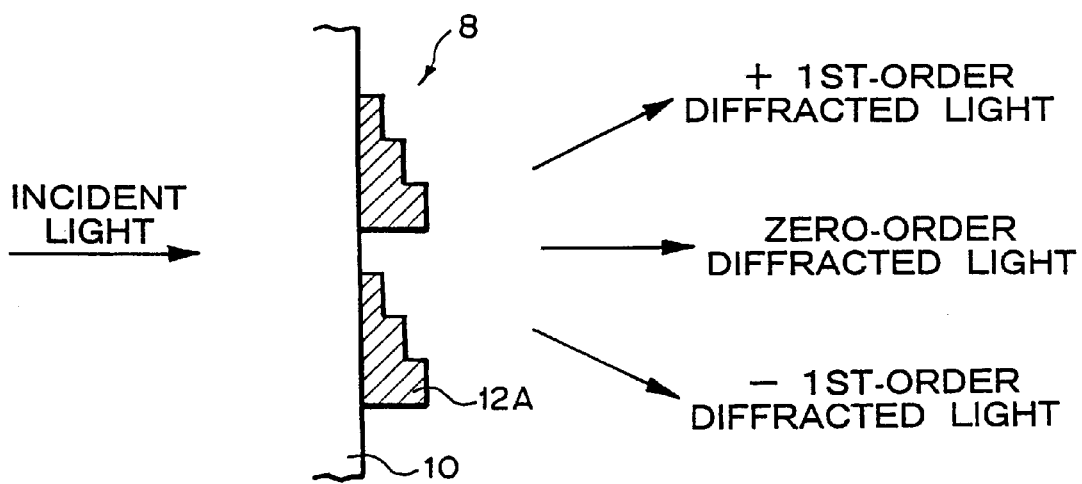
FIG. 8 is a schematic view showing directions of diffracted light in the diffraction type lens in accordance with an embodiment of the present invention.
Figure 9:
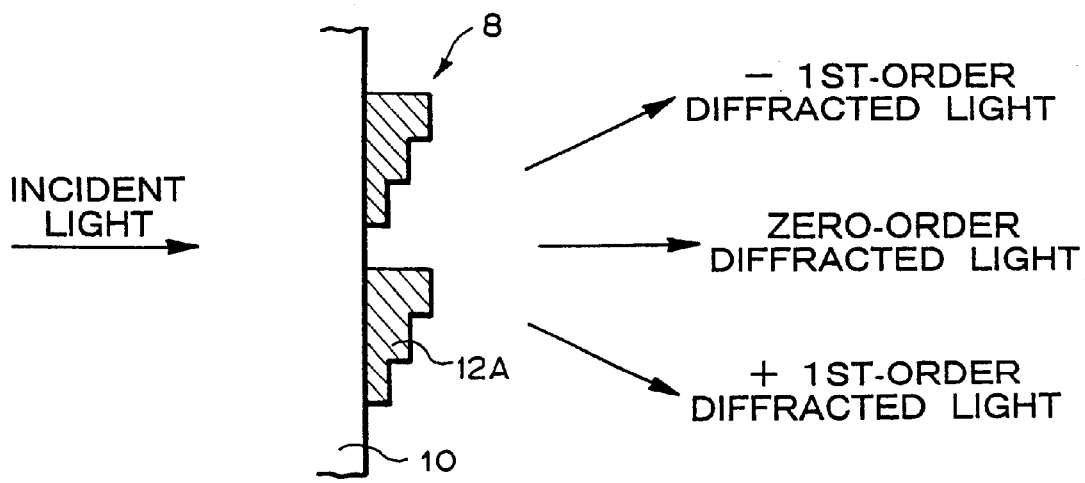
FIG. 9 is a schematic view showing directions of diffracted light in the diffraction type lens in accordance with an embodiment of the present invention.

Here, as shown in FIGS. 8 and 9, −1st-order light refers to the light diffracted from the lower step toward the higher step, whereas +1st-order light refers to the light diffracted from the higher step toward the lower step.

Figure 11:
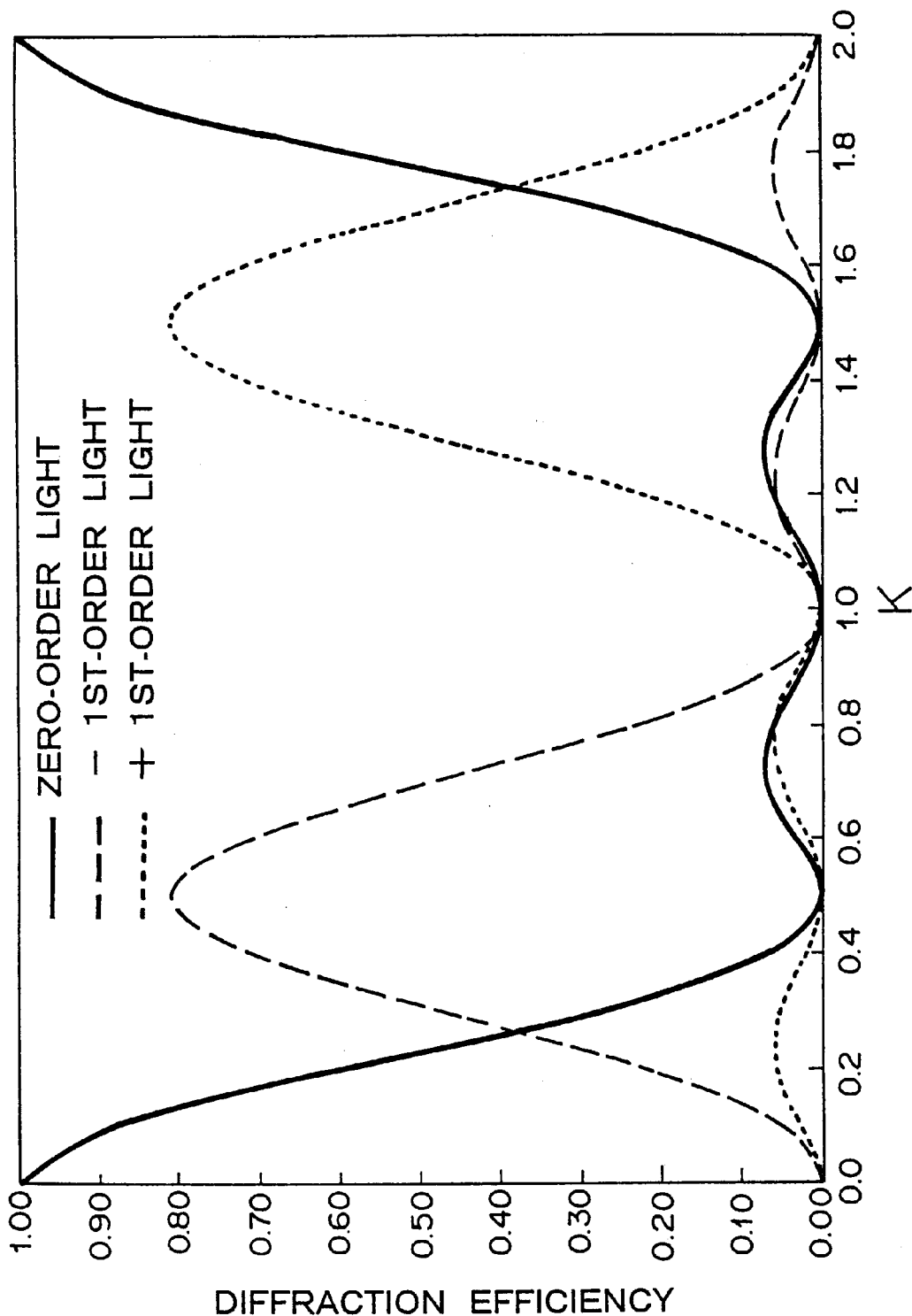
FIG. 11 is a graph showing the diffraction efficiency of a zone plate in the diffraction type lens in accordance with an embodiment of the present invention.

FIG. 11 shows how the ratio between zero-order diffracted light and ±1st-order diffracted light changes according to the value of K in the case where the above-mentioned conditional expressions (2) and (4) are used, indicating that the ratio of either of ±1st-order diffracted light is not lower than that of zero-order diffracted light within the range of $0.27 \leq K \leq 1.73$.

While the zone plates 12A and 12B change the respective diffraction efficiency values in zero-order diffracted light and ±1st-order diffracted light with respect to the light incident on the diffraction type lens 8 according to the value of K as such, the diffraction efficiency of −1st-order diffracted light or +1st-order diffracted light exceeds that of zero-order diffracted light if K is set to a value which is at least 0.27 but not exceeding 1.73. Further, in view of the light utilization efficiency, a practically unproblematic range of $0.27 \leq K_1$, $K_2 \leq 0.73$, or $1.27 \leq K_1$, $K_2 \leq 1.73$ is preferable.

Each of the zone plates 12A, 12B is formed by vapor coating of titanium dioxide ($TiO_2$) onto a glass substrate 10. The refractive index of titanium dioxide is 2.349 for light having a wavelength of 635 nm, and 2.299 for light having a wavelength of 780 nm.

FIGS. 4 to 7 show different embodiments of the above-mentioned diffraction type lens 8, respectively. Each embodiment can yield similar operations and effects.

The outermost diameters of the zone plates 12A, 12B may be set in view of the beam diameters of two wavelengths of incident laser beams 2. Which outermost diameter is larger or smaller can be set as appropriate.

The diffraction type lens of the present invention can be modified in various manners without being restricted to the above-mentioned embodiments. For example, plastic materials can be used as a material for forming a substrate, whereas various other kinds of materials such as metals, metal oxides, and nonmetals can be used as a material for forming a zone plate. The substrate and zone plates may integrally be formed from plastics as well.

The technique for forming the zone plates is not restricted to vapor deposition, whereas various techniques such as sputtering, plating, and roll-coating can be used.

The optical recording media used for recording and reproducing in the optical pickup apparatus are not limited to DVD and CD-R. The present invention is applicable to cases where two kinds of optical recording media whose specifications of wavelength regions to be used differ from each other are subjected to recording and reproducing in the same optical pickup apparatus.

The values of $L_1$, $L_2$ in the above-mentioned conditional expressions (1), (3) may be set to values different from integers within a practically unproblematic range, such that the values of $K_1$, $K_2$ are set to at least 0.27 and not greater than 0.73, or at least 1.27 and not greater than 1.73, respectively.

Substantially similar operations and effects can also be obtained when the zone plates formed in the above-mentioned first and second surfaces are interchanged therebetween.

EXAMPLES

In the following, the diffraction type lens in accordance with the present invention will further be explained with reference to Examples using specific values.

Example 1

The material for forming zone plates was titanium dioxide ($TiO_2$), the wavelength $\lambda_1$ of light irradiating DVD was 635 nm, and the wavelength $\lambda_2$ of light irradiating CD-R was 780 nm. As a consequence, titanium dioxide exhibited a refractive index $n_1$ of 2.349 for the wavelength $\lambda_1$ of light, and a refractive index $n_2$ of 2.299 for the wavelength $\lambda_2$ of light. Also, $L_1=8$ and $L_2=1$ were set in the above-mentioned conditional expressions (1) and (3), respectively. Therefore, the heights $h_1$ and $h_2$ per step of zone plates became 3.76575 µm and 0.60046 µm, respectively.

In this case, $M_1=6$ and $K_1=0.543$ in the above-mentioned conditional expression (2), whereas $M_2=1$ and $K_2=0.551$ in the above-mentioned conditional expression (4).

Here, the diffraction efficiency of the zone plate on the disc side (first surface side) was such that the respective ratios of zero-order diffracted light and −1st-order diffracted light were 1.1% and 78.5% for the wavelength of 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and −1st-order diffracted light were 0.8% and 79.3% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 2

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1=4$ and $L_2=26$ were set in the above-mentioned conditional expressions (1) and (3), respectively. As a consequence, the heights $h_1$ and $h_2$ per step of zone plates became 1.88288 µm and 15.61201 µm, respectively.

In this case, $M_1=3$ and $K_1=0.271$ in the above-mentioned conditional expression (2), whereas $M_2=33$ and $K_2=0.333$ in the above-mentioned conditional expression (4).

Here, the diffraction efficiency of the zone plate on the disc side (first surface side) was such that the respective ratios of zero-order diffracted light and −1st-order diffracted light were 18.9% and 56.6% for the wavelength 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and −1st-order diffracted light were 35.9% and 40.3% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 3

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1=3$ and $L_2=23$ were set in the above-mentioned conditional expressions (1) and (3), respectively. As a consequence, the heights $h_1$ and $h_2$ per step of zone plates became 1.41216 µm and 13.81062 µm, respectively.

In this case, $M_1=2$ and $K_1=0.704$ in the above-mentioned conditional expression (2), whereas $M_2=29$ and $K_2=0.679$ in the above-mentioned conditional expression (4).

Here, the diffraction efficiency of the zone plate on the disc side (first surface side) was such that the respective ratios of zero-order diffracted light and −1st-order diffracted light were 6.6% and 53.6% for the wavelength 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and −1st-order diffracted light were 7.2% and 47.1% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 4

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1=1$ and $L_2=10$ were set in the above-mentioned conditional expressions (1) and (3), respectively. As a consequence, the heights $h_1$ and $h_2$ per step of zone plates became 0.47072 µm and 6.00462 µm, respectively.

In this case, $M_1=0$ and $K_1=1.568$ in the above-mentioned conditional expression (2), whereas $M_2=12$ and $K_2=1.513$ in the above-mentioned conditional expression (4).

Here, the diffraction efficiency of the zone plate on the disc side (first surface side) was such that the respective ratios of zero-order diffracted light and +1st-order diffracted light were 0.1% and 80.9% for the wavelength 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and +1st-order diffracted light were 2.7% and 76.6% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 5

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1=10$ and $L_2=14$ were set in the above-mentioned conditional expressions (1) and (3), respectively. As a consequence, the heights $h_1$ and $h_2$ per step of zone plates became 4.70719 µm and 8.40647 µm, respectively.

In this case, $M_1=7$ and $K_1=1.679$ in the above-mentioned conditional expression (2), whereas $M_2=17$ and $K_2=1.718$ in the above-mentioned conditional expression (4).

Here, the diffraction efficiency of the zone plate on the disc side (first surface side) was such that the respective ratios of zero-order diffracted light and +1st-order diffracted light were 32.6% and 43.2% for the wavelength 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and +1st-order diffracted light were 21.7% and 53.7% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 6

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1=6$ and $L_2=6$ were set in the above-mentioned conditional expressions (1) and (3), respectively. As a consequence, the heights $h_1$ and $h_2$ per step of zone plates became 2.82431 $\mu$m and 3.60277 $\mu$m, respectively.

In this case, $M_1=4$ and $K_1=1.407$ in the above-mentioned conditional expression (2), whereas $M_2=7$ and $K_2=1.308$ in the above-mentioned conditional expression (4).

Here, the diffraction efficiency of the zone plate on the disc side (first surface side) was such that the respective ratios of zero-order diffracted light and +1st-order diffracted light were 7.0% and 50.0% for the wavelength 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and +1st-order diffracted light were 3.0% and 72.8% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

As explained in the foregoing, since front and back faces of a lens are provided with respective zone plates having stepped cross sections with wavelength selectivity characteristics and converging actions different from each other, the diffraction type lens and optical pickup apparatus of the present invention enable the zone plate on the front face side to converge the light having a wavelength for reproducing or recording one optical recording medium, and the zone plate on the back face side to converge the light having a wavelength for reproducing or recording the other optical recording medium.

Also, since the lens can be made thin, a sufficient working distance for focusing can be attained without yielding a long focal length.

Therefore, two wavelengths of light can be converged into recording surfaces of their corresponding optical recording media having disc thickness values different from each other, while satisfying demands for compactness and lower cost without complicating the structure of optical pickup apparatus.

What is claimed is:

1. A diffraction type lens, disposed in a luminous flux, having a wavelength selectivity;

wherein a substrate constituting said lens has one surface formed with a zone plate exhibiting a smaller converging action with respect to a first wavelength $\lambda_1$ of light and a greater converging action with respect to a second wavelength $\lambda_2$ of light, and the other surface formed with a zone plate exhibiting a smaller converging action with respect to said second wavelength $\lambda_2$ of light and a greater converging action with respect to said first wavelength $\lambda_1$ of light, said substrate being transparent to said first and second wavelengths $\lambda_1$ and $\lambda_2$ of light; and wherein each of said zone plates comprises concentric gratings having a stepped cross section;

wherein said one surface and other surface are on opposite sides of the lens and overlap each other.

2. A diffraction type lens according to claim 1, wherein said diffraction type lens has a parallel-plane form.

3. A diffraction type lens according to claim 1, wherein each of said stepped concentric gratings has three steps.

4. An optical pickup apparatus comprising the diffraction type lens according to claim 1, wherein said luminous flux incident on said diffraction type lens is a substantially parallel luminous flux.

5. An optical pickup apparatus according to claim 4, wherein said luminous flux is converged at a position where two kinds of optical recording media having respective thickness values different from each other are disposed, one optical recording medium being recorded or reproduced with said first wavelength $\lambda_1$ of light, the other optical recording medium being recorded or reproduced with said second wavelength $\lambda_2$ of light.

6. A diffraction type lens disposed in a luminous flux, having a wavelength selectivity;

wherein a substrate constituting said lens has one surface formed with a zone plate exhibiting a smaller converging action with respect to a first wavelength $\lambda_1$ of light and a greater converging action with respect to a second wavelength $\lambda_2$ of light, and the other surface formed with a zone plate exhibiting a smaller converging action with respect to said second wavelength $\lambda_2$ of light and a greater converging action with respect to said first wavelength $\lambda_1$ of light, said substrate being transparent to said first and second wavelengths $\lambda_1$ and $\lambda_2$ of light; and wherein each of said zone plates comprises concentric gratings having a stepped cross section;

wherein said one surface formed with the zone plate has a stepped portion with a height $h_1$ per step satisfying the following conditional expressions (1) and (2), and said the other surface formed with the zone plate has a stepped portion with a height $h_2$ per step satisfying the following conditional expressions (3) and (4):

$$h_1 = L_1 \lambda_1 / (n_1 - 1) \tag{1}$$

$$h_1 = M_1 \lambda_2 / (n_2 - 1) + K_1 \lambda_2 / 2(n_2 - 1) \tag{2}$$

$$h_2 = L_2 \lambda_2 / (n_2 - 1) \tag{3}$$

$$h_2 = M_2 \lambda_1 / (n_1 - 1) + K_2 \lambda_1 / 2(n_1 - 1) \tag{4}$$

where $\lambda_1$ and $\lambda_2$ are two wavelengths of incident light;

$n_1$ is the refractive index of grating portion with respect to the first wavelength $\lambda_1$ of light;

$n_2$ is the refractive index of grating portion with respect to the second wavelength $\lambda_2$ of light;

$L_1$ and $L_2$ are positive integers;

$M_1$ is the maximum value among 0 and positive integers satisfying the conditional expression of $h_1 > M_1 \lambda_2 / (n_2 - 1)$;

$M_2$ is the maximum value among 0 and positive integers satisfying the conditional expression of $h_2 > M_2 \lambda_1 / (n_1 - 1)$; and $K_1$ and $K_2$ are $0.27 \leq K_1, K_2 \leq 0.73$, or $1.27 \leq K_1, K_2 \leq 1.73$.

* * * * *